United States Patent
Munot et al.

(10) Patent No.: US 9,762,043 B2
(45) Date of Patent: Sep. 12, 2017

(54) IMPACT-ABSORBING WIRE AND CABLE FIXTURE, SYSTEM, AND RELATED METHODS

(71) Applicant: Marmon Utility LLC, Milford, NH (US)

(72) Inventors: Ashish Munot, Andover, MA (US); Edward Laughlin, Lowell, MA (US); Jared Argyle, Amherst, NH (US); Evan Moen, Davisburg, MI (US); Bob Biddle, Amherst, NH (US); Brian Boisclair, Goffstown, NH (US); Leonard P. Jean, Melbourne, FL (US)

(73) Assignee: Marmon Utility LLC, Milford, NH (US)

(*) Notice: Subject to any disclaimer, the term of this patent is extended or adjusted under 35 U.S.C. 154(b) by 168 days.

(21) Appl. No.: 14/474,529

(22) Filed: Sep. 2, 2014

(65) Prior Publication Data

US 2015/0060634 A1     Mar. 5, 2015

Related U.S. Application Data

(60) Provisional application No. 61/873,057, filed on Sep. 3, 2013.

(51) Int. Cl.
*H02G 7/00* (2006.01)
*H02G 7/05* (2006.01)
*H02G 3/00* (2006.01)

(52) U.S. Cl.
CPC ............ *H02G 7/053* (2013.01); *H02G 3/26* (2013.01)

(58) Field of Classification Search
CPC ..... F16L 3/00; F16L 3/16; H02G 7/05; H02G 7/053; H02G 7/00; H02G 7/02; H02G 7/18; H02G 7/08; H02G 3/26; H02G 15/117; H02G 7/06; H02G 7/12; H02G 7/14; H02G 7/20; H02G 7/056; H02G 7/53; E04H 12/24; H01R 4/643
USPC ............. 248/317, 58, 61, 636, 65; 174/40 R, 174/40 CC, 41–44, 45 R, 45 TD, 40 TD
See application file for complete search history.

(56) References Cited

U.S. PATENT DOCUMENTS

| | | | | |
|---|---|---|---|---|
| 776,695 A | * | 12/1904 | Ward | F16L 3/1233 174/40 CC |
| 1,362,038 A | * | 12/1920 | Plimpton | H02G 7/20 174/45 R |
| 1,680,548 A | * | 8/1928 | Keiser | E01F 15/06 248/66 |

(Continued)

FOREIGN PATENT DOCUMENTS

| JP | 2007118849 A | 5/2007 |
|---|---|---|
| JP | 2008281383 A | 11/2008 |
| JP | 2010239678 A | 10/2010 |

*Primary Examiner* — Pete Lee
(74) *Attorney, Agent, or Firm* — Hayes Soloway PC

(57) ABSTRACT

An impact-absorbing wire and/or cable fixture, system, and related methods are disclosed. The impact-absorbing wire fixture apparatus includes a substantially rigid bracket having at least a first arm and a second arm, wherein the first arm is connectable to a utility support structure. A twisted portion is positioned within the second arm, wherein the twisted portion is at least a 90° rotation of the second arm, wherein the twisted portion of the second arm has a width that exceeds a thickness. A fixturing portion is positioned at a distal end of the second arm.

18 Claims, 8 Drawing Sheets

(56) References Cited

U.S. PATENT DOCUMENTS

| | | | | | |
|---|---|---|---|---|---|
| 2,530,265 | A | * | 11/1950 | Phalen | A01K 97/10 224/922 |
| 3,288,408 | A | * | 11/1966 | Acker | H02G 7/056 248/61 |
| 4,358,177 | A | * | 11/1982 | Badolato | H01R 13/595 439/472 |
| 4,673,151 | A | * | 6/1987 | Pelz | F16L 3/1215 24/336 |
| 4,795,856 | A | * | 1/1989 | Farmer | F16L 3/223 174/40 R |
| 5,445,348 | A | * | 8/1995 | Caldwell | F16L 3/24 174/149 R |
| 5,655,284 | A | | 8/1997 | Ferrill et al. | |
| 5,721,393 | A | * | 2/1998 | Richardson, Jr. | H02G 7/125 174/146 |

\* cited by examiner

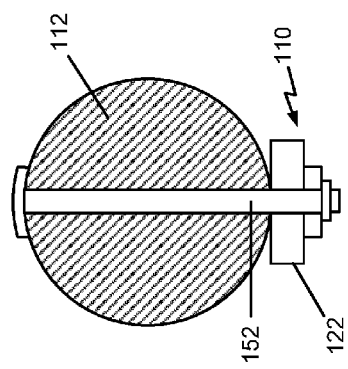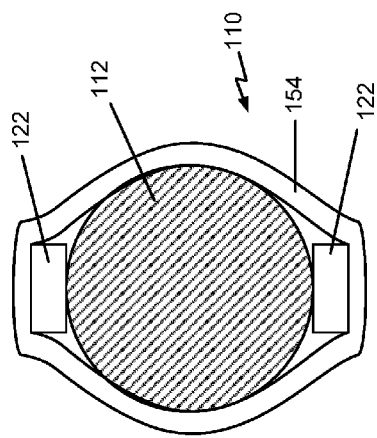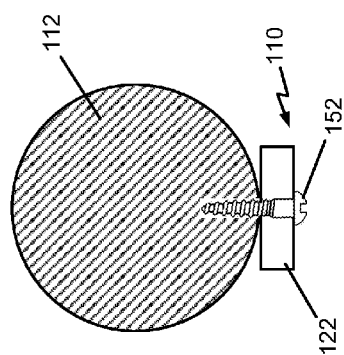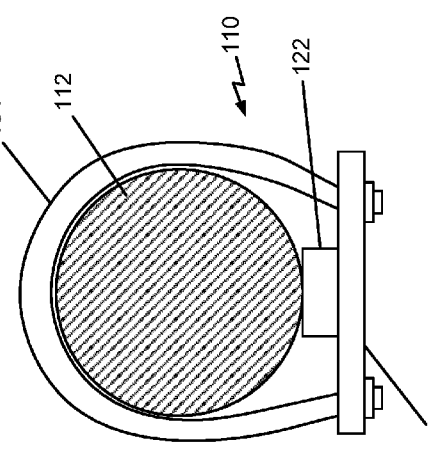

IMPACT-ABSORBING WIRE AND CABLE FIXTURE, SYSTEM, AND RELATED METHODS

CROSS REFERENCE TO RELATED APPLICATION

This application claims benefit of U.S. Provisional Application Ser. No. 61/873,057 entitled, "Impact-Absorbing Wire/Cable Fixture and Related Methods" filed Sep. 3, 2013, the entire disclosure of which is incorporated herein by reference.

FIELD OF THE DISCLOSURE

The present disclosure is generally related to wire and/or cable fixtures and more particularly is related to an impact-absorbing wire and cable fixture, system, and related methods.

BACKGROUND OF THE DISCLOSURE

Cables used in overhead transmission and distribution systems conventionally require one or more fixturing devices to retain them to a utility support structure, such as a utility pole or tower. These fixturing devices must be constructed from durable, reliable, and long-lasting materials, such as steel, to ensure that the cables will be successfully retained on the utility support structure safely and for an extended period of time. The fixturing devices need to be capable of holding the cable during non-inclement weather, but must also retain the cable during inclement weather and during conditions where objects may fall on the cable. For example, the fixturing devices must keep the cable supported on the utility support structure when a tree falls on a cable span.

FIG. 1 is a side view illustration of an overhead transmission and distribution wire fixturing device 10, in accordance with the prior art. FIG. 2 is a cross-sectional view illustration of the overhead transmission and distribution wire fixturing device 10 of FIG. 1 along the line A-A, in accordance with the prior art. FIG. 3 is a front view illustration of the overhead transmission and distribution wire fixturing device 10 of FIG. 1, in accordance with the prior art. With reference to FIGS. 1-3, the conventional fixturing device 10 is commonly fixed to the utility support structure 12 at a first end 14 and extends away from the utility support structure 12 towards a wire support end 16 having a wire clamp 18 or similar device. A wire 20 may be retained within the wire clamp 18. The fixturing device 10 may have a reinforced body 22 which gives the fixturing device 10 substantial durability and strength in resisting deformation and bending. As is best shown in FIG. 2, a common design for the reinforced body 22 may include an I-beam design which provides significant resistance to impact forces from any direction, yet allows the fixturing device 10 to have a reduced weight and lessened material manufacture consumption as compared to a reinforced body 22 having a solid design. This substantial durability and strength of the reinforced body 22 gives the fixturing device 10 the ability to withstand most impact forces on the wire 20.

In fact, it has been found that the conventional overhead transmission and distribution wire fixturing device 10 are so durable and sturdy that they commonly keep the wire 20 retained to the utility support structure 12 even when an impact force from a falling object is great enough to break the utility support structure 12. The utility support structure 12 must then be replaced fully, which becomes an expensive and timely process. Retaining the wire successfully while preventing the utility support structure 12 from breaking may save significant time and money.

Thus, a heretofore unaddressed need exists in the industry to address the aforementioned deficiencies and inadequacies.

SUMMARY OF THE DISCLOSURE

Embodiments of the present disclosure provide an impact-absorbing wire fixture apparatus. Briefly described, in architecture, one embodiment of the apparatus, among others, can be implemented as follows. A substantially rigid bracket has at least a first arm and a second arm, wherein the first arm is connectable to a utility support structure. A twisted portion is positioned within the second arm, wherein the twisted portion is at least a 90° rotation of the second arm, wherein the twisted portion of the second arm has a width that exceeds a thickness. A fixturing portion is positioned at a distal end of the second arm.

The present disclosure can also be viewed as providing a system for absorbing an impact on an overhead-mounted utility wire. Briefly described, in architecture, one embodiment of the system, among others, can be implemented as follows. A substantially rigid bracket is mounted to a utility support structure, the substantially rigid bracket having at least a first arm and a second arm, wherein the first arm is connected to the utility support structure. A twisted portion is positioned within the second arm, wherein the twisted portion is at least a 90° rotation of the second arm, wherein the twisted portion of the second arm has a width that exceeds a thickness. A fixturing portion is positioned at a distal end of the second arm. A wire support device is affixed to the fixturing portion, the wire support device retaining at least a portion of a wire.

The present disclosure can also be viewed as providing a method of absorbing an impact force within a wire fixture apparatus. In this regard, one embodiment of such a method, among others, can be broadly summarized by the following steps: retaining a substantially rigid bracket to a utility support structure, wherein the substantially rigid bracket has at least a first arm and a second arm, wherein the first arm is connected to the utility support structure; supporting a utility wire on a distal end of the second arm; and absorbing an impact force applied to the utility wire with a twisted portion of the second arm, the twisted portion having a width that exceeds a thickness and having at least a 90° rotation of the second arm, whereby the twisted portion is bent by the impact force.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 9A-9D are cross-sectional illustrations of the impact-absorbing wire fixture apparatus of FIG. 6, in accordance with the first exemplary embodiment of the present disclosure.

DETAILED DESCRIPTION

Figure 1:
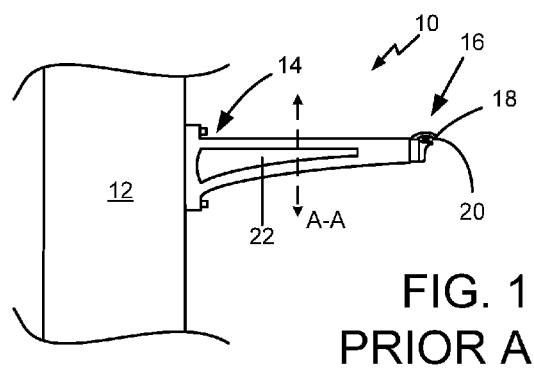
FIG. 1 is a side view illustration of an overhead transmission and distribution wire fixturing device, in accordance with the prior art.
Figure 2:
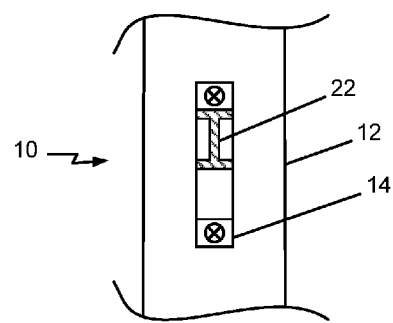
FIG. 2 is a cross-sectional view illustration of the overhead transmission and distribution wire fixturing device of FIG. 1 along the line A-A, in accordance with the prior art.
Figure 3:
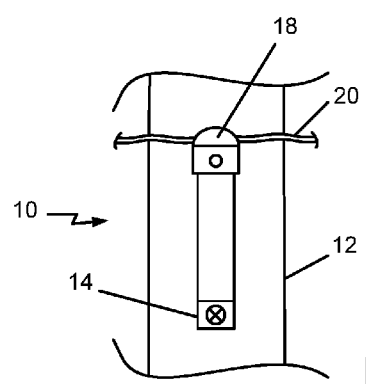
FIG. 3 is a front view illustration of the overhead transmission and distribution wire fixturing device of FIG. 1, in accordance with the prior art.
Figure 4:
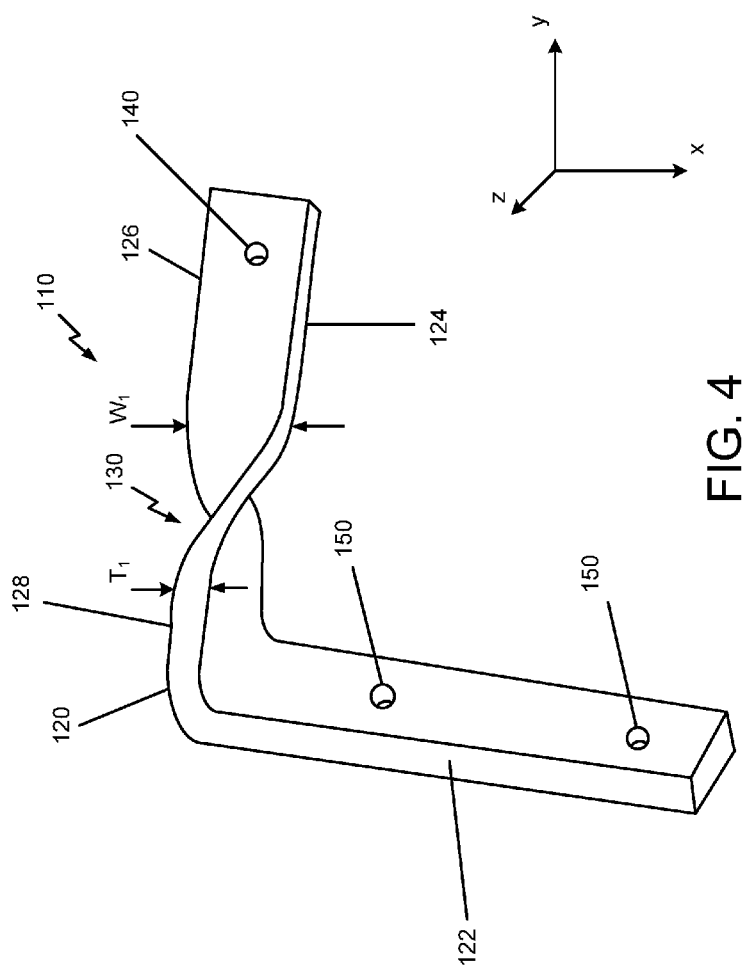
FIG. 4 is an isometric view illustration of an impact-absorbing wire fixture apparatus, in accordance with a first exemplary embodiment of the present disclosure.
Figure 6:
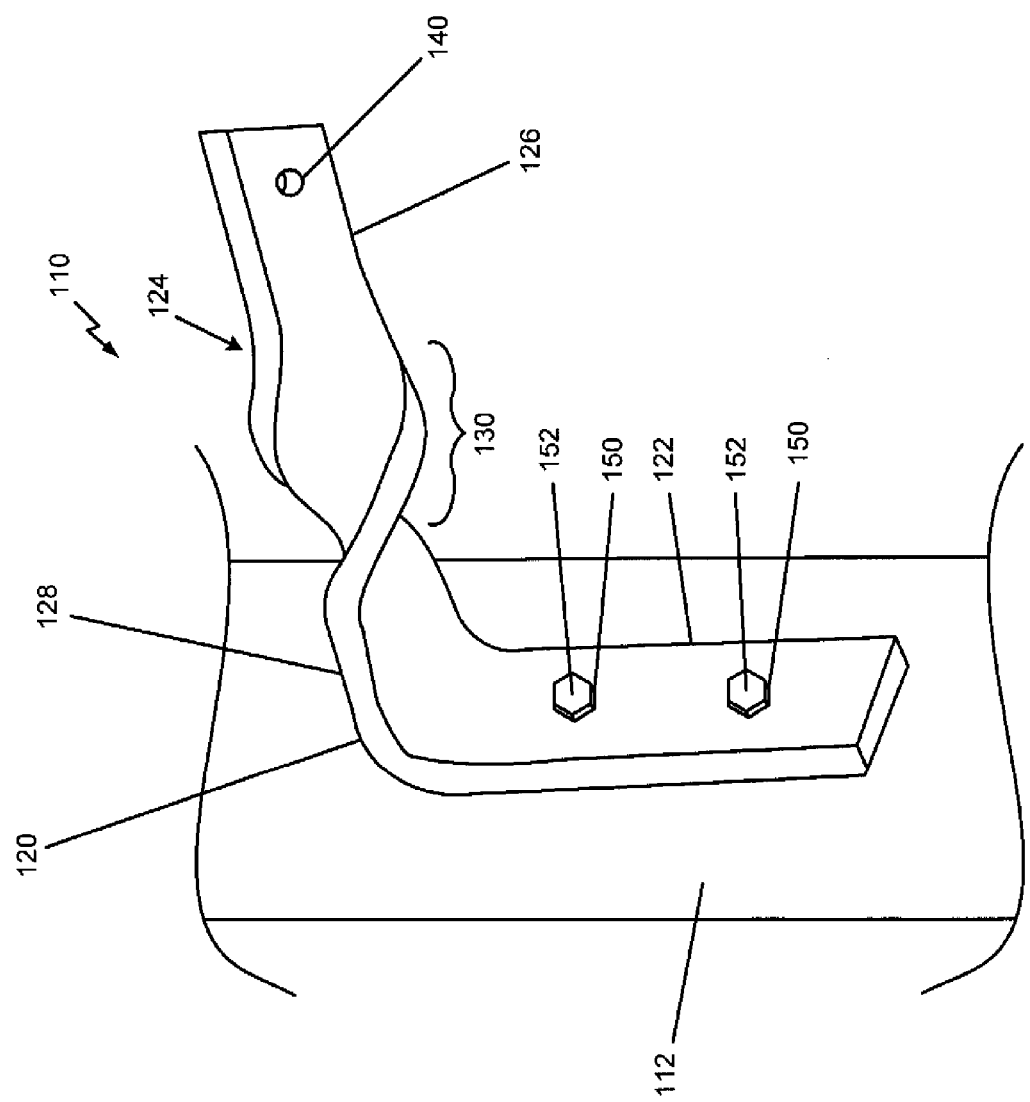
FIG. 6 is an isometric view illustration of the impact-absorbing wire fixture apparatus of FIG. 5 affixed to a utility support structure, in accordance with the first exemplary embodiment of the present disclosure.

FIG. 4 is an isometric view illustration of an impact-absorbing wire fixture apparatus 110, in accordance with a first exemplary embodiment of the present disclosure. The impact-absorbing wire fixture apparatus 110, which may be referred to herein simply as 'apparatus 110' includes a substantially rigid bracket 120 (hereinafter, 'bracket 120') having at least a first arm 122 and a second arm 124. The bracket 120 is connectable to a utility support structure 112 (FIG. 6). A twisted portion 130 is positioned within the second arm 124, wherein the twisted portion 130 is at least a 90° rotation of the second arm 124. The twisted portion 130 of the second arm 124 also has a width $W_1$ that exceeds a thickness $T_1$. A fixturing portion 140 is positioned at a distal end 126 of the second arm 124.

The apparatus 110 may be used to support and retain a utility wire 114 on an overhead utility support structure 112 while absorbing or partially absorbing impact forces that the utility wire 114 experiences, for example, when trees or other objects fall on to the utility wire. In accordance with this disclosure, it is noted that the utility wire may include any type of wire, cable, or similar structure having utility with distribution and/or transmission of utility services, electrical services, communication services, or derivatives thereof. The utility support structure 112 may include a utility pole, a tower, a building, or another heightened structure that is capable of supporting the utility wire 114.

As can be seen in FIG. 4, the first exemplary embodiment includes a bracket 120 that is substantially L-shaped with the first arm 122 positioned substantially perpendicular to the second arm 124. Other angular positions of the first arm 122 relative to the second arm 124 are available. Holes 150 within the first arm 122 may allow attachment of the bracket 120 to the utility support structure 112, such as a utility pole or tower. In this arrangement, the first arm 122 may be positioned substantially parallel with the length of the utility support structure 112 while the second arm 124 extends laterally. The fixturing portion 140 of the second arm 122 may also have a hole or other structure for attachment with a wire support device 160, such as a messenger clamp or a guide and clamp assembly. It is noted that embodiments of the present disclosure exist where the first arm 122 is integral or combined with a fastener that retains the apparatus 110 to the utility support structure 112, such that a single straight member (the second arm 124) of the substantially rigid bracket 120 having the twisted portion 130 is affixed directly to the utility support structure 112 and extends away from it.

The bracket 120 may be formed from a hardened, rigid material, such as steel. Surface coatings such as galvanization may be used to ensure that the apparatus 110 is weather-resistant. The first arm 122 of the bracket 120 may be connectable to a utility support structure 112 with at least one fastener, such as a threaded fastener 152 or clamp, as is discussed further relative to FIGS. 9A-9D. It is noted that while the first and second arms 122, 124 depicted in FIG. 4 have substantially the same dimensions, the first and second arms 122, 124 may have any varying dimensions. For example, it may be possible to utilize a first arm 122 that is smaller or larger than the second arm 124.

The twisted portion 130 of the bracket 120 has a width that exceeds a thickness, as is depicted in FIG. 4, where the width is identified by $W_1$ and the thickness is identified by $T_1$. The difference in dimension between the width and the thickness allows the twisted portion 130 to have a stronger force resistance along its width than along its thickness. The width and the thickness of the twisted portion 130 may be constant throughout an entire length of the twisted portion 130, or the width and thickness may vary, depending on the design of the apparatus 110.

The twisted portion 130 of the apparatus 110 includes a bend or rotation within the material that forms the second arm 124 along a portion of the second arm 124. The twisted portion 130 may be at least a 90° rotation of the second arm 124, but may also include rotations of between 90° and 180°, and greater than 180°. With a rotation of 90°, one planar side e.g., a back face of the second arm 124 at a distal end 126 of the second arm 124) faces a perpendicular direction to that of an opposing planar side (e.g., a front face of the second arm 124 at the proximal end 128 of the second arm 124). In other words, a cross-section of the second arm 124 at the proximal end 128 would be positioned substantially 90° out of alignment with a cross-section of the second arm 124 at the distal end 126. With a rotation of 180°, one planar side of the second arm 124 at a distal end 126 of the second arm 124 faces the same direction as an opposing planar side of the second arm 124 at the proximal end 128 of the second arm 124. Thus, the rotation of the twisted portion 130 may be substantially aligned with an elongated length of the second arm 124 and measured between the relative radial direction of the faces of the distal end 126 and the proximal end 128 of the second arm 124 which the twisted portion 130 is positioned between.

When a force is applied to the bracket 120 or to a wire 114 supported by the second arm 124 of the bracket 120, the twisted portion 130 may be more apt to deform than the non-twisted areas of the bracket 120, since the twisted portion 130 allows for a varying thickness of material in 360° about the second arm 124. In other words, with the rare and limited exception of a force being applied directly along the axis of the second arm 124, the twisted portion 130 allows for the thickness $T_1$ to face a force applied from any direction. With reference to the coordinates of FIG. 4, it can be seen that a force applied to the twisted portion 130 along the X or Z directions will allow the twisted portion 130 to bend about its thickness $T_1$.

When a force is applied to the bracket 120 or to a wire 114 supported by the second arm 124 of the bracket 120, the twisted portion 130 of the second arm 124 may be more apt to bend or deform along its thickness than along its width. Furthermore, when a force is applied to the twisted portion 130, either directly or through the utility wire 114, the twisted portion 130 may merely deflect or bend under the force, but not deform. The ability of the twisted portion 130 of the bracket 120 to bend or flex slightly without suffering from a deformation in shape may allow for absorption of some or a portion of the impact force sufficient to prevent damage to the utility support structure 112.

Figure 5:
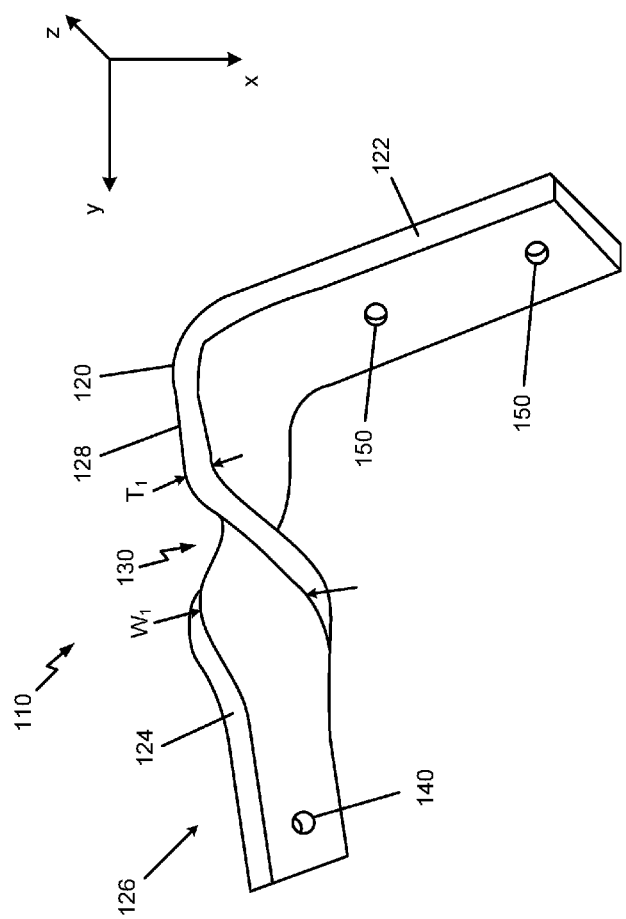
FIG. 5 is an isometric view illustration of an impact-absorbing wire fixture apparatus, in accordance with a first exemplary embodiment of the present disclosure.

FIG. 5 is an isometric view illustration of an impact-absorbing wire fixture apparatus 110, in accordance with the first exemplary embodiment of the present disclosure. In particular, FIG. 5 depicts the apparatus 110 with a 180° rotation within the twisted portion 130. As is shown, the bracket 120 has at least a first arm 122 and a second arm 124 and is connectable to a utility support structure 112 (FIG. 6). A twisted portion 130 is positioned within the second arm 124, wherein the twisted portion 130 is at least a 180° rotation of the second arm 124. The twisted portion 130 of the second arm 124 also has a width $W_1$ that exceeds a thickness $T_1$. A fixturing portion 140 is positioned at a distal end 126 of the second arm 124.

As can be seen in FIG. 5. the first exemplary embodiment includes a bracket 120 that is substantially L-shaped with the first arm 122 positioned substantially perpendicular to the second arm 124. Other angular positions of the first arm 122 relative to the second arm 124 are available. Holes 150 within the first arm 122 may allow attachment of the bracket 120 to the utility support structure 112, such as a utility pole or tower. In this arrangement, the first arm 122 may be positioned substantially parallel with the length of the utility support structure 112 while the second arm 124 extends laterally. The fixturing portion 140 of the second arm 122 may also have a hole or other structure for attachment with a wire support device 160, such as a messenger clamp or a guide and clamp assembly. It is noted that embodiments of the present disclosure exist where the first arm 122 is integral or combined with a fastener that retains the apparatus 110 to the utility support structure 112, such that a single straight member (the second arm 124) of the substantially rigid bracket 120 having the twisted portion 130 is affixed directly to the utility support structure 112 and extends away from it.

The bracket 120 may be formed from a hardened, rigid material, such as steel. Surface coatings such as galvanization may be used to ensure that the apparatus 110 is weather-resistant. The first arm 122 of the bracket 120 may be connectable to a utility support structure 112 with at least one fastener, such as a threaded fastener 152 or clamp, as is discussed further relative to FIGS. 9A-9D. It is noted that while the first and second arms 122, 124 depicted in FIG. 5 have substantially the same dimensions, the first and second arms 122, 124 may have any varying dimensions. For example, it may be possible to utilize a first arm 122 that is smaller or larger than the second arm 124.

The twisted portion 130 of the bracket 120 has a width that exceeds a thickness, as is depicted in FIG. 5, where the width is identified by $W_1$ and the thickness is identified by $T_1$. The difference in dimension between the width and the thickness allows the twisted portion 130 to have a stronger force resistance along its width than along its thickness. The width and the thickness of the twisted portion 130 may be constant throughout an entire length of the twisted portion 130, or the width and thickness may vary, depending on the design of the apparatus 110.

The twisted portion 130 of the apparatus 110 includes a bend or rotation within the material that forms the second arm 124 along a portion of the second arm 124. The twisted portion 130 may be at least a 180° rotation of the second arm 124, but may also include rotations as discussed relative to FIG. 4. With a rotation of 180°, one planar side of the second arm 124 at a distal end 126 of the second arm 124 faces the same direction as an opposing planar side of the second arm 124 at the proximal end 128 of the second arm 124. In other words, a cross-section of the second arm 124 (having a uniform cross-section) would, at the proximal end 128, be positioned substantially 90° aligned with a cross-section of the second arm 124 at the distal end 126. Thus, the rotation of the twisted portion 130 may be substantially aligned with an elongated length of the second arm 124 and measured between the relative radial direction of the faces of the distal end 126 and the proximal end 128 of the second arm 124 which the twisted portion 130 is positioned between.

When a force is applied to the bracket 120 or to a wire 114 supported by the second arm 124 of the bracket 120, the twisted portion 130 may be more apt to deform than the non-twisted areas of the bracket 120, since the twisted portion 130 allows for a varying thickness of material in 360° about the second arm 124. In other words, with the rare and limited exception of a force being applied directly along the axis of the second arm 124, the twisted portion 130 allows for the thickness $T_1$ to face a force applied from any direction. With reference to the coordinates of FIG. 4, it can be seen that a force applied to the twisted portion 130 along the X or Z directions will allow the twisted portion 130 to bend about its thickness $T_1$.

When a force is applied to the bracket 120 or to a wire 114 supported by the second arm 124 of the bracket 120, the twisted portion 130 of the second arm 124 may be more apt to bend or deform along its thickness than along its width. Furthermore, when a force is applied to the twisted portion 130, either directly or through the utility wire 114, the twisted portion 130 may merely deflect or bend under the force, but not deform. The ability for the twisted portion 130 of the bracket 120 to bend or flex slightly without suffering from a deformation in shape may allow for absorption of some or a portion of the impact force sufficient to prevent damage to the utility support structure 112.

FIG. 6 is an isometric view illustration of the impact-absorbing wire fixture apparatus 110 of FIG. 5 affixed to a utility support structure 112, in accordance with the first exemplary embodiment of the present disclosure. The apparatus 110 may be retained to the utility support structure 112 with one or more fasteners 152 positioned through the holes 150 within the first arm 122 of the bracket 120. In this position, the first arm 122 may be substantially aligned with the length of the utility support structure 112, such as with a backside of the first arm 122 being positioned in abutment with an exterior surface of the utility support structure 112. The second arm 124, with the twisted portion 130 positioned between proximal and distal ends 128, 126 thereof, may be positioned to extend in a substantially perpendicular direction from the length of the utility support structure 112, which allows a wire 114 (not shown) affixed to the fixturing portion 140 of the second arm 124 to be located remote from the utility support structure 112. While the apparatus 120 is shown with a substantially 90° bend between the first and second arms 122, 124, the bend may vary depending on the design of the apparatus 110.

Figure 7:
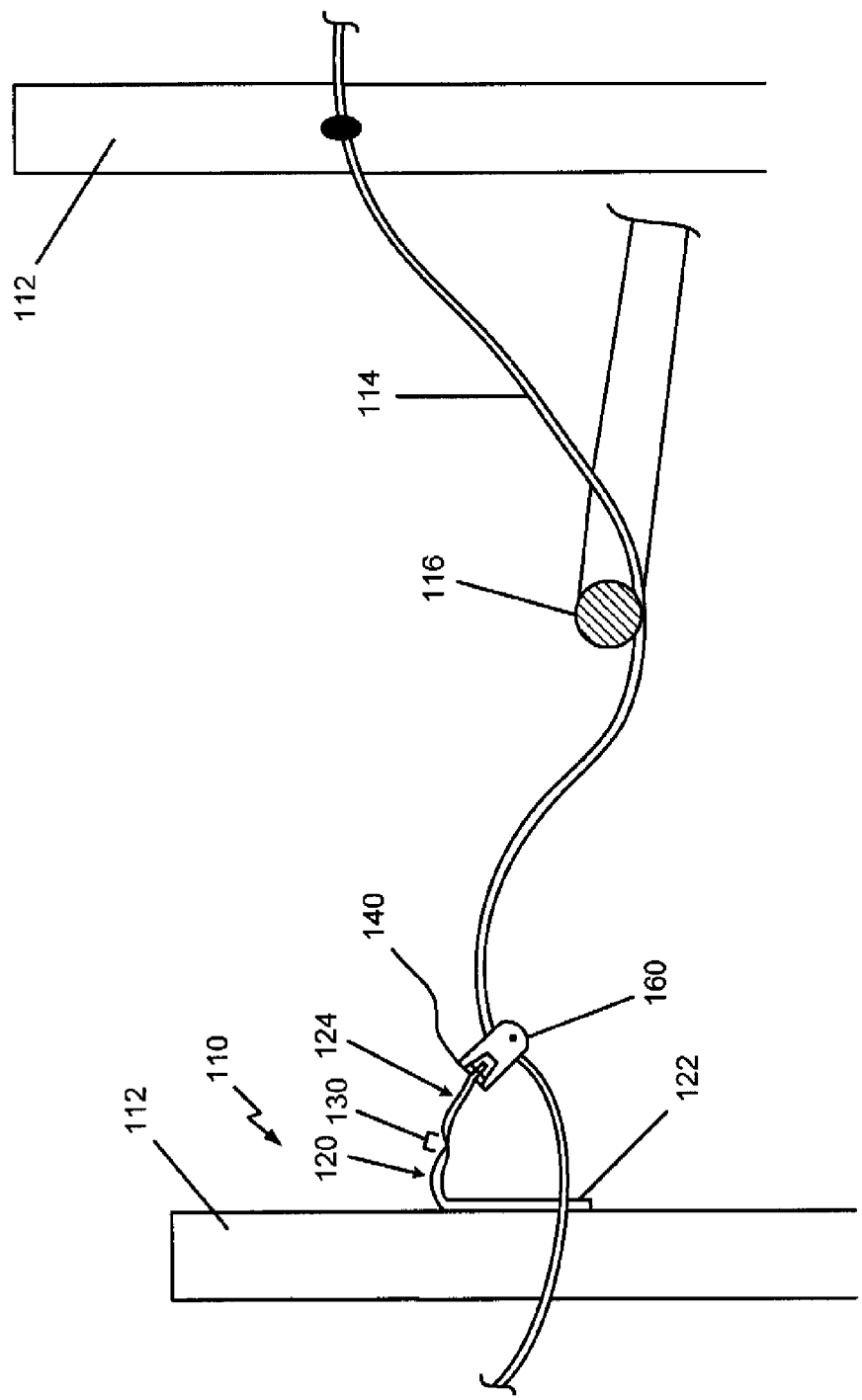
FIG. 7 is a schematic illustration of the impact-absorbing wire fixture apparatus of FIGS. 5-6 in use with a utility support structure after absorbing an impact force, in accordance with the first exemplary embodiment of the present disclosure.

FIG. 7 is schematic illustration of the impact-absorbing wire fixture apparatus 110 of FIGS. 4-6 in use with a utility support structure 112 after absorbing an impact force, in accordance with the first exemplary embodiment of the present disclosure. A plurality of utility support structures 112 are used to retain a wire 114 in an elevated position. The wire 114 is retained with a wire support device 160, such as a messenger clamp, which is affixed to the fixturing portion 140 of the apparatus 110, as is discussed relative to FIG. 8. An impact force represented by a fallen object 116, such as a tree, lamp post, or similar object, is applied to the wire 114, such that the force is transferred from the midsection of the wire 114 to the portions of the wire 114 proximate to the utility support structures 112.

The impact force from the fallen object 116 causes the bracket 120 to be deformed in, at, or near the twisted portion 130, such that the twisted portion 130 may be manipulated from its original shape from the impact force. The at least 90° rotation within the twisted portion 130 allows for at least partial absorption of the impact force from the fallen object 116 in any direction it may fall on the wire 114, including angularly-applied forces with combined vertical and horizontal forces. The bending of the twisted portion 130 allows for enough absorption of the impact force, such that any breaking or damage to the utility support structure 112 is prevented or minimized. A bracket structure that does not have a twisted portion 130 is designed to resist bending and deformation, and generally does resist any bending and deformation, which acts to transfer the impact force to the utility support structure 112 causing it to be damaged. While the apparatus 110 absorbing the impact force at the twisted portion 130 will result in damage to the apparatus 110, replacement of the apparatus 110 is generally far easier, less expensive, and desired over replacement of the utility support structure 112.

Figure 8:
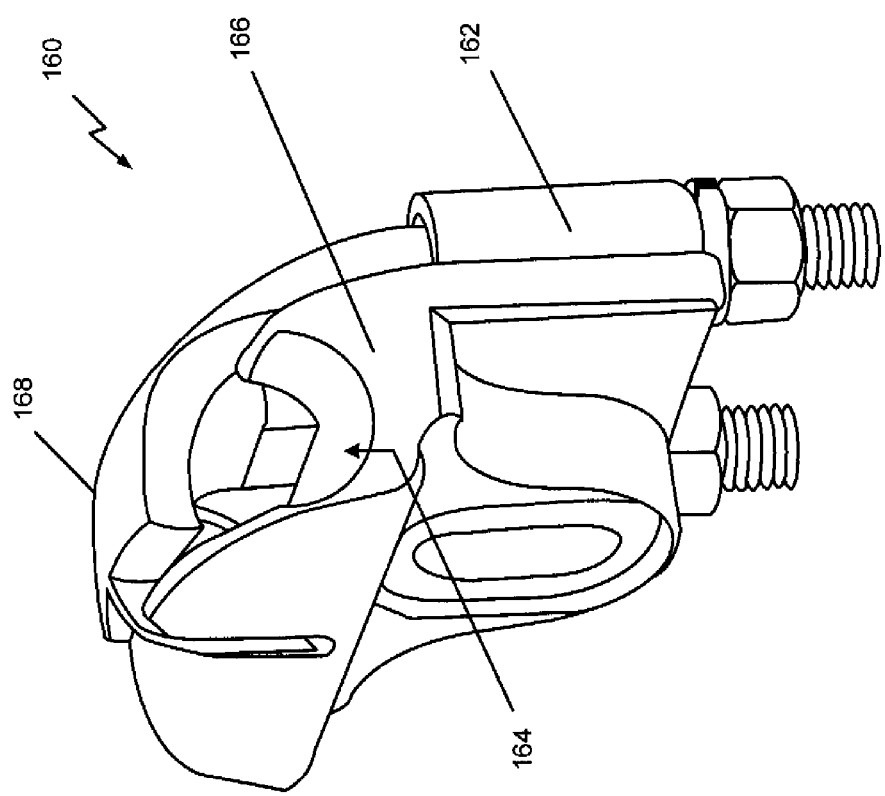
FIG. 8 is an isometric view illustration of a wire support device for use with the impact-absorbing wire fixture apparatus of FIG. 5, in accordance with the first exemplary embodiment of the present disclosure.

FIG. 8 is an isometric view illustration of a wire support device 160 for use with the impact-absorbing wire fixture apparatus 110 of FIG. 5, in accordance with the first exemplary embodiment of the present disclosure. The wire support device 160 may be a messenger clamp which includes a body 162 having a wire channel 164 formed between a wire seat 166 and an adjustable wire clamp 168. The adjustable wire clamp 168 is removably connected to the body 162 with threaded fasteners, allowing for the adjustable wire clamp 168 to be tightened down on a wire 114 or messenger wire (not shown) when it is positioned within the wire channel 164. In use, the utility wire support device 160 may be affixed to the fixturing portion 140 of the apparatus 110 in an elevated position on a utility support structure 112. The wire 114 may be strung through the wire channel 164 with the adjustable wire clamp 168 in a loosened state relative to the body 162. When the wire 114 reaches the desired position, the adjustable wire clamp 168 may be tightened down on the wire 114 to fasten and secure it in place.

FIGS. 9A-9D are cross-sectional illustrations of the impact-absorbing wire fixture apparatus 110 of FIG. 6, in accordance with the first exemplary embodiment of the present disclosure. In particular, each of FIGS. 9A-9D illustrates a variation on affixing the apparatus 110 to the utility support structure 112. For example, in FIG. 9A, the first arm 122 of the apparatus 110 may be affixed to the utility support structure 112 with a threaded fastener 152 which is drivable into the utility support structure 112. The threaded fastener 152 may have a pointed end which is embedded within the utility support structure 112. In a similar fashion, FIG. 9B illustrates the threaded fastener 152 being a through-bolt which traverses through the entirety of the utility support structure 112. This through-bolt fastener 152 may be secured in place with appropriate nuts or comparable fixturing components.

FIG. 9C illustrates the first arm 122 of the apparatus 110 secured to the utility support structure 112 with a fixturing band 154 which is secured around the utility support structure 112 and connected to a fixturing bar 156. The fixturing band 154 may be tightened to the fixturing bar 156 to bias the first arm 122 towards the utility support structure 112. Similarly, FIG. 9D illustrates a fixturing band 154 which is positioned around the utility support structure 112 and biases two or more first arms 122 of two or more apparatuses 110. The fixturing band 154 may be secured around the two or more first arms 122 with a variety of devices, including fasteners or clamps, allowing the fixturing band 154 to remain taut around the first arms 122 and the utility support structure 112. Any combination of the designs disclosed relative to FIGS. 9A-9D may be used, and other designs for securing conventional fixturing devices to utility support structures 112 may also be employed with the apparatus 110, all of which are considered within the scope of the present disclosure.

Figure 10:
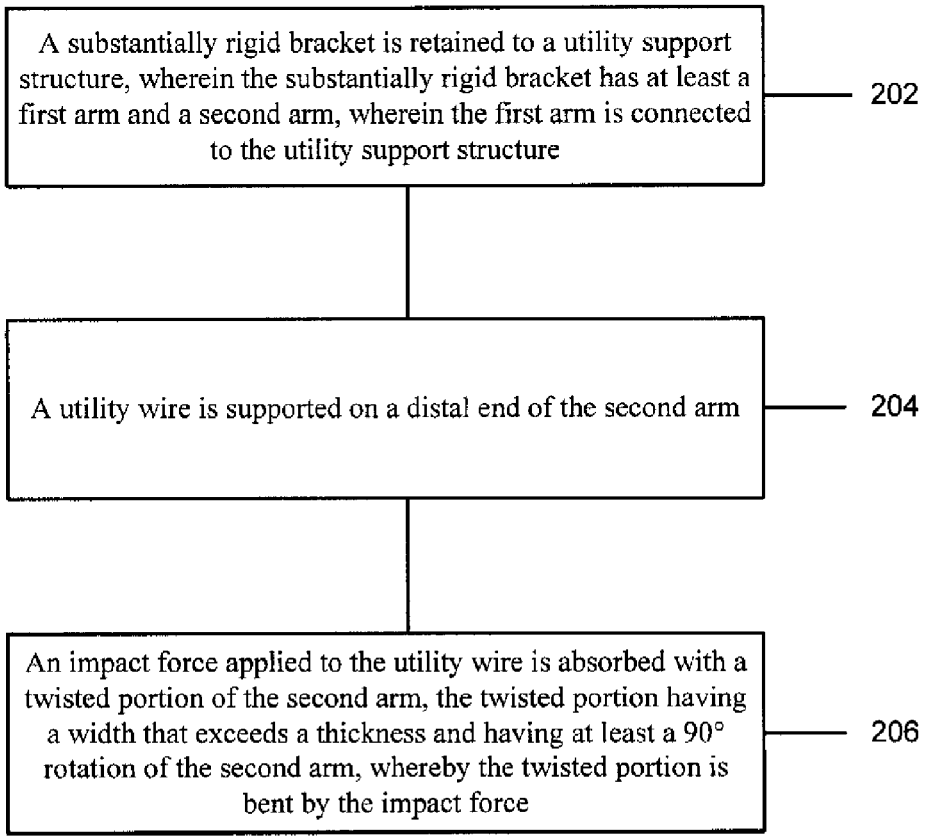
FIG. 10 is a flowchart illustrating a method of absorbing an impact force within a wire fixture in accordance with the first exemplary embodiment of the disclosure.

FIG. 10 is a flowchart 200 illustrating a method of absorbing an impact force within a wire fixture in accordance with the first exemplary embodiment of the disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a substantially rigid bracket is retained to a utility support structure, wherein the substantially rigid bracket has at least a first arm and a second arm, wherein the first arm is connected to the utility support structure. A utility wire is supported on a distal end of the second arm (block 204). An impact force applied to the utility wire is absorbed with a twisted portion of the second arm, the twisted portion having a width that exceeds a thickness and having at least a 90° rotation of the second arm, whereby the twisted portion is bent by the impact force (block 206). It is noted that the method may include any additional steps, processes, functions, or structures, including any steps, processes, functions, or structures disclosed relative to FIGS. 1-9D herein.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment of the disclosure without departing substantially from the spirit and principles of the disclosure. All such modifications and variations are intended to be included herein within the scope of this disclosure and the present disclosure and protected by the following claims.

What is claimed is:

1. An impact-absorbing wire fixture apparatus comprising:
   a substantially rigid bracket comprising:
      a first arm connectable to a utility support structure such that a length of the first arm is substantially parallel to a mounting surface of the utility support structure; and
      a second arm extending from the first arm substantially perpendicular to the mounting surface of the utility support structure, wherein the second arm comprises a proximal end and a distal end, and a cross-section of the second arm at the proximal end is substantially aligned with a cross-section of the second arm at the distal end;
      a twisted portion positioned within the second arm, wherein:
         the twisted portion is at least a 90-degree rotation of the second arm;
         a width of the twisted portion exceeds a thickness of the twisted portion;
         the twisted portion is configured to bend in a direction along its thickness when an impact force is applied thereto; and
         the twisted portion is positioned between the distal end and the proximal end of the second arm; and
      a fixturing portion positioned at the distal end of the second arm, wherein the twisted portion is positioned between the fixturing portion and the first arm.

2. The impact-absorbing wire fixture apparatus of claim 1, wherein the at least 90-degree rotation of the second arm is substantially aligned with an elongated length of the second arm.

3. The impact-absorbing wire fixture apparatus of claim 1, wherein the at least 90-degree rotation of the second arm is between 90 degrees and 180 degrees.

4. The impact-absorbing wire fixture apparatus of claim 1, wherein the at least 90-degree rotation of the second arm is greater than 180 degrees.

5. The impact-absorbing wire fixture apparatus of claim 1, wherein the first arm is connectable to a utility support structure with at least one fastener.

6. The impact-absorbing wire fixture apparatus of claim 1, wherein the width and the thickness of the twisted portion are constant throughout an entire length of the twisted portion.

7. The impact-absorbing wire fixture apparatus of claim 1, further comprising a wire support device affixed to the fixturing portion of the second arm.

8. An impact-absorbing wire fixture apparatus, comprising:
   a substantially rigid bracket comprising:
      a first arm connectable to a utility support structure such that a length of the first arm is substantially parallel to a mounting surface of the utility support structure; and
      a second arm extending from the first arm substantially perpendicular to the mounting surface of the utility support structure;
   a twisted portion positioned within the second arm, wherein:
      the twisted portion is at least a 90-degree rotation of the second arm;
      a width of the twisted portion exceeds a thickness of the twisted portion; and
      the twisted portion is configured to bend in a direction along its thickness when an impact force is applied thereto;
   a fixturing portion positioned at the distal end of the second arm, wherein the twisted portion is positioned between the fixturing portion and the first arm; and
   a wire support device affixed to the fixturing portion of the second arm, the wire support device comprising:
      a body having a wire seat defining a bottom surface of a wire channel; and
      an adjustable wire clamp connectable to the body, wherein the adjustable wire clamp is positioned over the wire channel, and wherein a wire is locatable within the wire channel.

9. The impact-absorbing wire fixture apparatus of claim 8, wherein:
   the second arm further comprises a proximal end;
   the twisted portion is positioned between the distal end and the proximal end of the second arm; and
   a cross-section of the second arm at the proximal end is substantially aligned with a cross-section of the second arm at the distal end.

10. The impact-absorbing wire fixture apparatus of claim 8, wherein:
    the second arm further comprises a proximal end;
    the twisted portion is positioned between the distal end and the proximal end of the second arm; and
    a cross-section of the second arm at the proximal end is positioned substantially 90 degrees out of alignment with a cross-section of the second arm at the distal end.

11. A system for absorbing an impact on an overhead-mounted utility wire, the system comprising:
    a utility support structure;
    a substantially rigid bracket mounted to the utility support structure and comprising:
       a first arm connected to the utility support structure such that a length of the first arm is substantially parallel to a mounting surface of the utility support structure; and
       a second arm extending from the first arm substantially perpendicular to the mounting surface of the utility support structure;
    a twisted portion positioned within the second arm, wherein:
       the twisted portion is at least a 90-degree rotation of the second arm;
       a width of the twisted portion exceeds a thickness of the twisted portion; and
       the twisted portion is configured to bend in a direction along its thickness when an impact force is applied thereto;
    a fixturing portion positioned at a distal end of the second arm, wherein the twisted portion is positioned between the fixturing portion and the first arm; and
    a wire support device affixed to the fixturing portion, comprising:
       the wire support device retaining at least a portion of a wire;
       a body having a wire seat defining a bottom surface of a wire channel; and an adjustable wire clamp connectable to the body, wherein the adjustable
wire clamp is positioned over the wire channel, and wherein the portion of the wire is positioned within the wire channel.

12. The system for absorbing an impact on an overhead-mounted utility wire of claim 11, wherein the first arm is connected to the utility support structure with at least one fastener.

13. A system for absorbing an impact on an overhead-mounted utility wire, the system comprising:
a utility support structure;
a substantially rigid bracket mounted to the utility support structure and comprising:
a first arm connected to the utility support structure such that a length of the first arm is substantially parallel to a mounting surface of the utility support structure; and
a second arm extending from the first arm substantially perpendicular to the mounting surface of the utility support structure;
a twisted portion positioned within the second arm, wherein:
the twisted portion is at least a 90-degree rotation of the second arm;
a width of the twisted portion exceeds a thickness of the twisted portion; and
the twisted portion is configured to bend in a direction along its thickness when an impact force is applied thereto;
a fixturing portion positioned at a distal end of the second arm, wherein the twisted portion is positioned between the fixturing portion and the first arm; and
a wire support device affixed to the fixturing portion, the wire support device retaining at least a portion of a wire;
a threaded fastener configured to mount the substantially rigid bracket to the utility support structure by being inserted into the utility support structure;
a through-bolt fastener configured to mount the substantially rigid bracket to the utility support structure by being inserted through the utility support structure; and
a fixturing band configured to mount the substantially rigid bracket to the utility support structure by encircling the utility support structure.

14. The system for absorbing an impact on an overhead-mounted utility wire of claim 13, wherein the twisted portion is configured to bend at a section of the twisted portion where the thickness faces a direction of the impact force applied.

15. The system for absorbing an impact on an overhead-mounted utility wire of claim 13, wherein the first arm is configured to resist bending when the impact force is applied to the wire.

16. A method of absorbing an impact force within a wire fixture apparatus, the method comprising:
retaining a substantially rigid bracket to a utility support structure, wherein the substantially rigid bracket comprises:
a first arm connected to the utility support structure such that a length of the first arm is substantially parallel to a mounting surface of the utility support structure;
a second arm extending from the first arm substantially perpendicular to the mounting surface of the utility support structure; and
a twisted portion positioned within the second arm, wherein:
the twisted portion is at least a 90-degree rotation of the second arm;
a width of the twisted portion exceeds a thickness of the twisted portion; and
the twisted portion is configured to bend in a direction along its thickness when an impact force is applied thereto; and
supporting a utility wire on a distal end of the second arm, comprising:
a body having a wire seat defining a bottom surface of a wire channel; and
an adjustable wire clamp connectable to the body, wherein the adjustable
wire clamp is positioned over the wire channel, and wherein the wire is positioned within the wire channel.

17. The method of claim 16, wherein retaining the substantially rigid bracket to the utility support structure comprises utilizing at least one of:
a threaded fastener configured to mount the substantially rigid bracket to the utility support structure by being inserted into the utility support structure;
a through-bolt fastener configured to mount the substantially rigid bracket to the utility support structure by being inserted through the utility support structure; and
a fixturing band configured to mount the substantially rigid bracket to the utility support structure by encircling the utility support structure.

18. The method of claim 16, wherein the twisted portion is configured to bend at a section of the twisted portion where the thickness faces a direction of the impact force applied.

* * * * *